United States Patent [19]

Mierzwinski

[11] 3,813,686

[45] May 28, 1974

[54] AMBIENT LIGHT RESPONSIVE CONTROL OF BRIGHTNESS, CONTRAST AND COLOR SATURATION

[75] Inventor: Eugene Peter Mierzwinski, Fort Wayne, Ind.

[73] Assignee: The Magnovox Company, Ft. Wayne, Ind.

[22] Filed: Apr. 13, 1973

[21] Appl. No.: 350,853

Related U.S. Application Data

[63] Continuation-in-part of Ser. No. 309,872, Nov. 27, 1972.

[52] U.S. Cl. ........ 358/27, 178/5.4 AC, 178/7.5 DC

[51] Int. Cl. .......................................... H04n 9/12

[58] Field of Search ...... 178/5.4 R, 5.4 AC, 5.4 BT, 178/7.5 R, 7.5 DC

[56] References Cited

UNITED STATES PATENTS

| | | | |
|---|---|---|---|
| 2,264,172 | 11/1941 | Batchelor | 178/7.5 |
| 2,310,671 | 2/1943 | Batchelor | 178/7.5 |
| 3,025,345 | 3/1962 | Suhrmann | 178/7.5 |
| 3,027,421 | 3/1962 | Heiligers | 178/7.5 |
| 3,112,424 | 11/1963 | Suhrmann | 315/10 |
| 3,147,341 | 9/1964 | Gibson, Jr. | 178/7.5 |
| 3,164,673 | 1/1965 | Sharon | 178/7.5 |
| 3,165,582 | 1/1965 | Korda | 178/7.5 |
| 3,200,193 | 8/1965 | Biggs et al. | 178/5.4 AC |
| 3,214,517 | 10/1965 | Vogt et al. | 178/7.5 DC |
| 3,258,532 | 6/1966 | Loughlin | 178/7.5 |
| 3,315,029 | 4/1967 | Suhrmann | 178/5.4 |
| 3,622,696 | 11/1971 | Macintyre, Jr. | 178/7.5 DC |
| 3,649,755 | 3/1972 | Newman | 178/7.5 DC |
| 3,755,619 | 8/1973 | Lovely et al. | 178/5.4 AC |

3,649,755 3/1972 Newman .......................... 178/7.5 DC

OTHER PUBLICATIONS

Electronics World pp. 27, 98 November 1966.

*Primary Examiner*—Robert L. Richardson
*Attorney, Agent, or Firm*—Thomas A. Briody; R. T. Seeger; W. W. Holloway

[57] ABSTRACT

A circuit deployed in a color television receiver for varying the brightness, contrast and color saturation of a displayed picture in accordance with variations in ambient light in the vicinity of a receiver screen is disclosed comprising a light sensing means mounted near the receiver screen and having an electrical parameter which varies in accordance with variations in the light incident on the light sensing means and means responsive to those variations in the electrical parameter for varying the gains imparted to the luminance and chrominance signals in separately controlled diverse manners. In the disclosed preferred embodiment the light sensing means is a light dependent resistor such as a simple cadmium sulphide cell the resistance of which varies in response to changes in the light impinging thereon. These variations in resistance are used to control the gain of both the chrominance and the luminance amplifiers of the receiver with the luminance gain being changed with a first particular gain rate and the chrominance gain at a second particular gain rate with a given change in ambient light level. In a preferred embodiment, the luminance gain rate is approximately 50 percent greater than the chroma gain rate for a given change in ambient light, when such gains are measured in decibels.

14 Claims, 4 Drawing Figures

AMBIENT LIGHT RESPONSIVE CONTROL OF BRIGHTNESS, CONTRAST AND COLOR SATURATION

RELATED APPLICATIONS

This is a continuation in part of copending application Ser. No. 309,872 filed Nov. 27, 1972, entitled Ambient Light Responsive Control of Brightness, Contrast and Color Saturation by Eugene Mierzwinski:

BACKGROUND OF THE INVENTION

The present invention relates generally to a television receiver control system and more particularly to a control system for maintaining proper balance between room lighting conditions and the level of picture tube excitation in a color television receiver. More especially the present invention functions to increase contrast, intensity and chroma signal strength when the room lighting level increases to diminish these parameters when the level of room lighting decreases.

Conventional television receivers, of course, have manually operable controls by means of which a viewer may set the level of contrast, intensity, and chroma signal strength to what he feels to be an optimum level for given room lighting conditions. Under changed room lighting conditions, the viewer will obtain the optimum viewing situation by changing these manual controls to a new preferred level.

It is also known in the prior art to automate this process for a black and white television receiver, for example, as taught in the U.S. Pat. No. 3,165,582 to Korda, issued Jan. 12, 1965, and the French patent 1,223,058 issued in June of 1960.

It is accordingly an object of the present invention to provide an automatic color saturation control for a color television receiver by providing separate, predetermined gains for the luminance and chroma for a given change in ambient light. In the disclosed preferred embodiment, the luminance signal is attenuated 3.3 dB and the chroma signal is attenuated 2.1 dB for a change in ambient light from 100 footcandles to 0.1 footcandles, measured at the display face.

SUMMARY OF THE INVENTION

The foregoing as well as numerous other objects and advantages of the present invention are achieved by providing a light sensitive element in a television receiver exposed to ambient light in the vicinity of the receiver for separately controlling brightness, contrast and chroma signal strength of the displayed picture in accordance with the level of ambient light. The circuit of a preferred embodiment of the present invention, in response to an increase of ambient light level, functions to increase the gain of the luminance amplifier in a relatively greater ratio than the increase in the gain of the chrominance amplifier whereas when the ambient light level decreases the respective gains of these two amplifiers are decreased, again, with the change in the luminance signal being in a greater proportion than the change in the chroma signal strength signal. By using the teaching of this invention, other gain relationships between the luminance components and chroma signal, for a given change in ambient light, may be automatically attained to achieve a desired result of luminance and color saturation.

BRIEF DESCRIPTION OF THE DRAWINGS

The aforementioned and other objects, features and advantages of the present invention will become more apparent from the following detailed description thereof when considered in conjunction with the drawings wherein:

FIG. 3 illustrates chroma gain control characteristic curves for the circuit of FIG. 2.

DESCRIPTION OF THE PREFERRED EMBODIMENT

Figure 1:
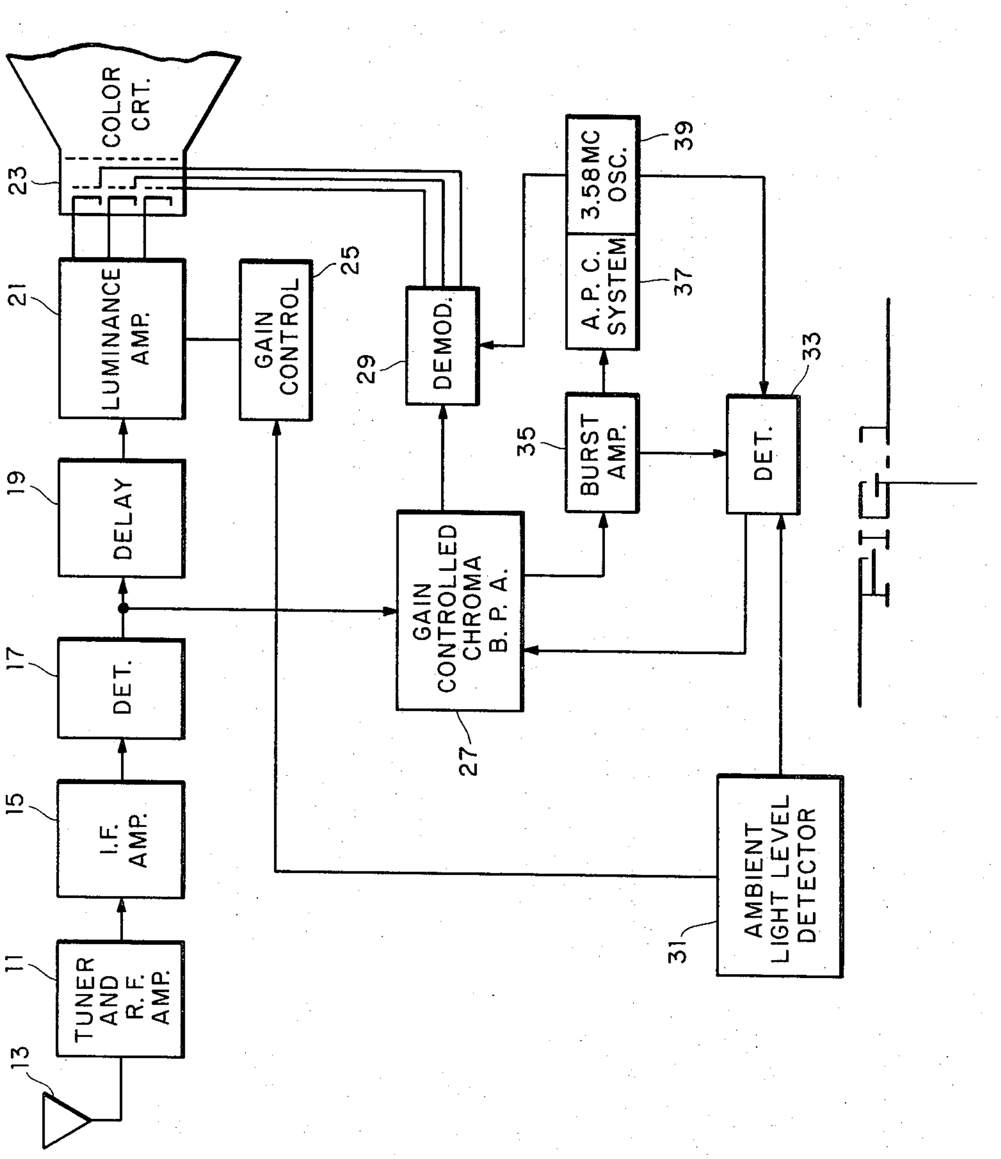
FIG. 1 is a partial block diagram of a color television receiver employing the present invention.
Figure 2:
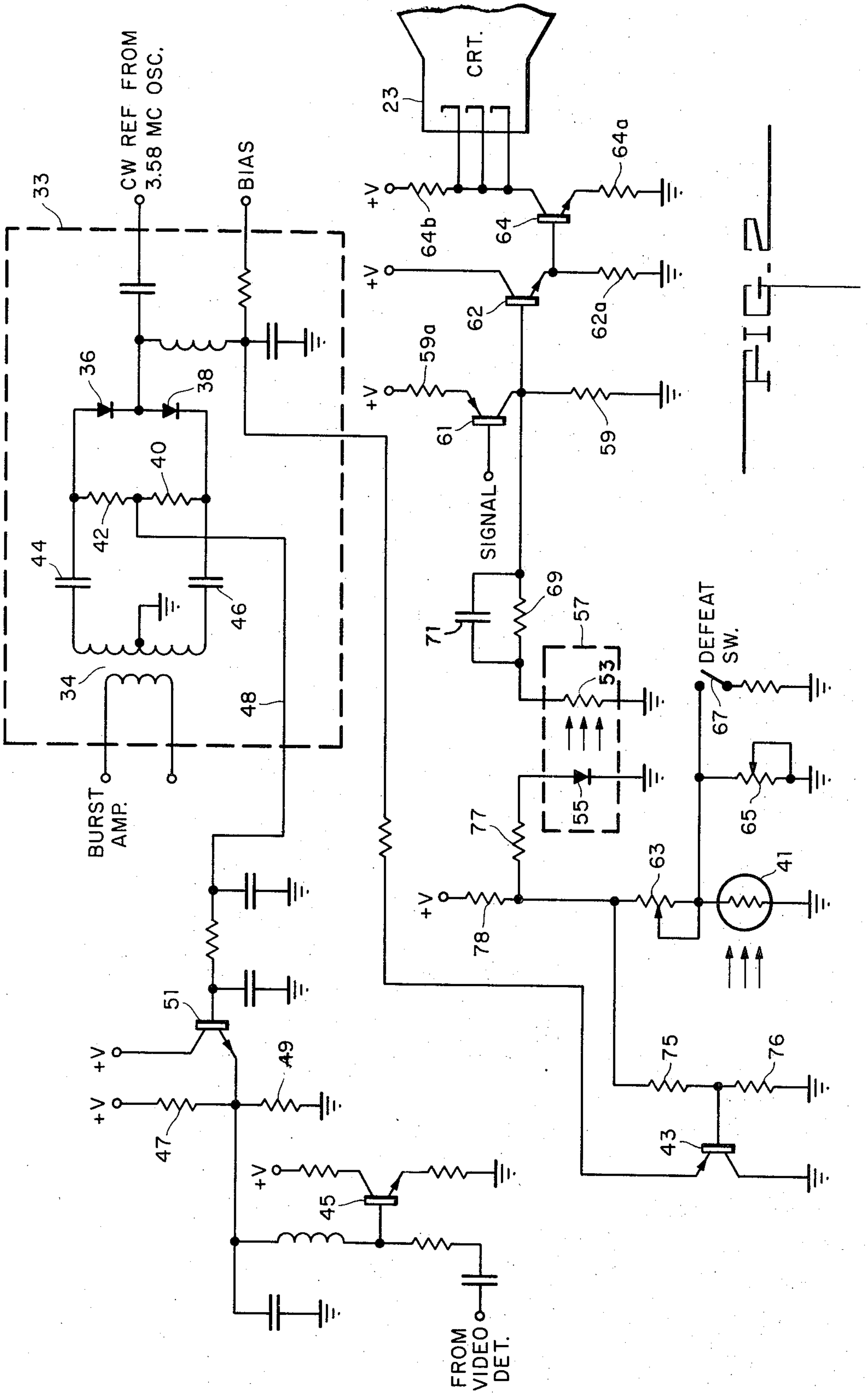

Considering first FIG. 1 which illustrates generally in block diagram form a color television receiver embodying the present invention, this receiver is seen to comprise a tuner and radio frequency amplifier 11 for detecting and amplifying incoming signals received on the antenna 13 and supplying those signals through an appropriate heterodyning process to an intermediate frequency amplifier 15. After detection in the detector 17, the luminance signals are passed through a delay 19 which compensates for the delays experienced by the chroma signal strength signals and then to the luminance amplifier 21, which, of course, corresponds to the video amplifier of a black and white receiver, to then be supplied to the cathode ray tube 23. The luminance or video amplifier may also be provided with gain control circuitry 25. An appropriate band pass amplifier 27 may be employed to separate out the chroma signal strength signals which are demodulated by the demodulator 29 in well known fashion to provide the three color difference signals to grids in the color cathode ray tube 23. While the present invention will be described with respect to such color difference signals, it is equally applicable to direct RGB color separation systems. An ambient light level detector 31 such as a light dependent resistor of the cadmium sulphide variety is physically located on the front of the television receiver in such a position as to be exposed to the light levels in the vicinity of the receiver so that its resistance varies inversely in accordance with variations in the ambient light levels around the receiver. These resistance variations are then employed to control the gain of the luminance amplifier 21 by way of gain control 25 and to control the gain of the chroma signal strength amplifier circuitry.

The entire color demodulation process is only generally depicted in the block diagram of FIG. 1 and is illustrated as a closed loop burst gain controlled chroma amplifier system with auxiliary chroma gain control introduced by way of the detector 33 from the ambient light level detector 31. A burst gain controlled chroma amplifier circuit is somewhat analogous to a black and white keyed AGC circuit and functions to set the gain level of the amplifier 27 in accordance with the color sync burst rather than the chroma signal level associated with a particular picture. While the present invention is being described with respect to this preferred type of gain control, it would, of course, be possible, in television circuits employing DC gain controls for chroma and/or contrast, to connect the ambient light tracking means to these direct current control circuits. The gain controlled chroma band pass amplifier, of course, supplies an output to a burst amplifier 35 which in turn drives an automatic phase control system 37 for synchronizing the 3.58 megacycle oscillator 39 the output of which is used in the color demodulation process.

Figure 2:
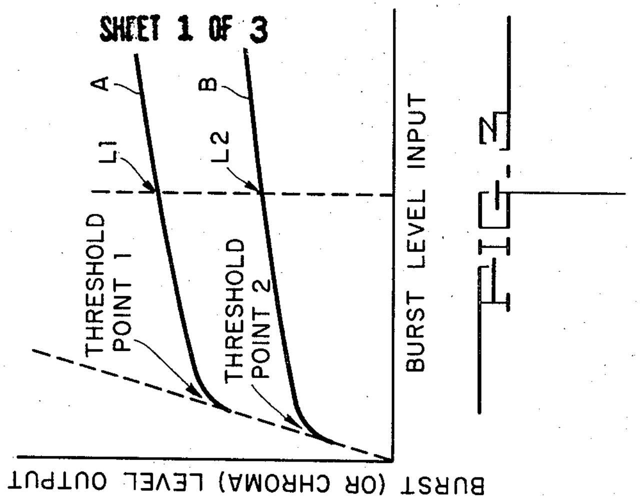
FIG. 2 is a detailed schematic diagram of those portions of FIG. 1 embodying the present invention.

Considering now FIG. 2 which illustrates schematically in detail those portions of the receiver of FIG. 1 necessary for a complete understanding of the present invention, the light dependent resistor 41 is mounted near the front of the television receiver in such a position as to adequately receive the ambient lighting conditions in the vicinity of the receiver. The resistance of this device is inversely proportional to the intensity of light incident thereon. If the room ambient light experiences an increase in level, the resistance of light dependent resistor 41 will decrease which decrease in turn lowers the voltage at the base of transistor 43 which in turn lowers the voltage at the emitter due to increased conduction through that transistor. This in turn increases the gain of the chroma amplifier transistor stage 45. More precisely the lowering the voltage at the emitter of transistor 43 raises a threshold in the automatic chroma control detector 33 so that the chroma signal strength signal, and hence the color saturation level, to the picture tube is increased. In the absence of a chroma signal with its synchronizing burst, the gain of the chroma amplifier is set at a maximum by the voltage divider comprising resistors 47 and 49. At this time there is no output from the automatic chroma control detector to the base of transistor 51 and that transistor is non-conducting.

When a color signal is received, the detector provides an output signal proportional to the color sync burst level which turns on the transistor 51 to control the gain of the chroma amplifier stage 45 so as to maintain the desired output level. The turn on level of transistor 51 represents a fairly well defined knee in the chroma gain control characteristic curves illustrated in FIG. 3. Operation beyond the knee or threshold of such a curve operates to maintain a nearly constant chroma output level while operation below the knee of the curve and its extension as the almost vertical dotted line represents the open loop characteristic wherein there is no automatic gain control to the chroma amplifier. Since transistor 51 is non-conducting below the knee of this curve, gain control is delayed until the output signal reaches this threshold point. Since variations in the potential at the emitter of transistor 43 cause corresponding variations in the potential at the base of transistor 51, it is clear that a variation in the resistance of the light dependent resistor 41 will, for example, cause the gain control characteristic curve to shift from that depicted by curve A to that depicted by curve B and that for a given burst level input as represented by the vertical dotted line, two different levels of chroma output which, in turn, cause two different levels of color saturation will be achieved by a change in the light intensity incident on the resistor 41.

To better understand the operation of detector 33, assume that the burst voltage induced across the top half of the secondary of transformer 34 is in phase with the 3.58 megacycle reference signal and that the burst voltage induced across the bottom half of the secondary of transformer 34 is 180° out of phase with this reference signal. Assuming further that the diodes 36 and 38 have equal characteristics, that the resistors 40 and 42 are equal, that the capacitors 44 and 46 are equal, and that the two portions of the secondary winding on transformer 34 are equal when no burst is being received, diodes 36 and 38 will conduct equally but during opposite portions of a cycle. Diode 36 conducts during negative excursions of the reference signal whereas diode 38 conducts during positive portions of that reference wave form. Thus during the negative portions of the reference wave form diode 36 conducts to charge capacitor 44 so that its right hand plate is negative and its left hand plate is positive. During the positive excursions, diode 38 conducts to charge capacitor 46 with its right hand plate positive and its left hand plate negative. Under this assumed no burst input condition the net charge on these capacitors yields a voltage on line 48 which is zero. If noise is introduced into the system, it will be of equal amplitude but opposite phase across the two diodes and both diodes will be affected to an equal extent resulting in no change in the voltage on line 48. When during a color telecast a burst signal is present, we may assume that the burst voltage induced across the two portions of the secondary of transformer 34 are of equal amplitude to the 3.58 megacycle reference signal. With this situation the diode 36 will not conduct since the burst voltage is equal in phase and amplitude to the reference signal and its anode and cathode remain at the same potential. The diode 38 will, however, conduct readily since the burst and reference signals have an additive rather than a cancelling effect on it resulting in the diode 38 conducting twice as much as in the previous no burst example and resulting in the capacitor 46 charging to about twice its previous voltage which voltage is presented on line 48 as a control signal.

Suppose now that the burst signal amplitude is reduced to one half that of the foregoing example. With this new assumption the phase relationships remain as before but now diode 36 will conduct about one half its previous amount while diode 38 conducts about one and one half times its previous amount resulting in a voltage on line 48 which is about one half the previous voltage.

The voltage on line 48 which is approximately proportional to the burst voltage is applied to the base of transistor 51 which biases the base of the chroma amplifier transistor 45 thereby controlling the gain of that chroma amplifier stage.

A variation in threshold can be achieved by altering the conduction points of the diodes 36 and 38. This is accomplished by applying a bias voltage to the junction of these two diodes to alter their respective points of conduction thereby changing the output voltage on line 48. For example, if a positive 2-volt direct current bias is applied to the junction of the two diodes, under a no burst input condition, diode 38 will conduct sooner and turn off later than with no bias applied, while diode 36 will turn on later and off sooner than under the no bias condition. This results in a control voltage on line 48 under the no burst condition. In other words, a bias voltage applied to the junction of the two diodes acts as an additional bias on the chroma amplifier stage thereby affecting its gain.

The control of brightness (intensity) and contrast is achieved in the present invention by a second light dependent resistor 53 which is optically coupled to a light emitting diode 55. LIght emitting diode 55 and light dependent resistor 53 are encapsulated in a light impervious housing illustrated by the dotted line 57. As the room ambient light changes, the change in the resistance of light dependent resistor 41 causes a change in the current through light emitting diode 55. Variations in the current through the light emitting diode cause corresponding variations in the light emitted thereby which in turn cause variations in the resistance of the light dependent resistor 53. The luminance or video amplifier is here illustrated as a three transistor amplifier with the output of the first amplifier stage being across resistor 59. A diminution in the resistance of light dependent resistor 53 causes a lowering of this output impedance and thus a diminution in the gain of the luminance amplifier. In other words, if the light intensity in the room increases, the resistance of resistor 41 will decrease causing a decrease in the current through light emitting diode 55 and, therefore, a decrease in its light output level and this decreased light will cause an increase in the resistance of light dependent resistor 53 thus increasing the effective output load resistor for the transistor 61 thus increasing the gain of the video amplifier as desired.

Variable resistor 63 being effectively in series with the light dependent resistor 41 may be varied to compensate for differences in specific light dependent resistors so as to establish a desired level of picture brightness, contrast and color saturation for a given level of ambient light. Variable resistance 65 which is in parallel with the light dependent resistor 41 may be varied so as to effectively change the range of variation in brightness, contrast and color saturation for a specific range of variations in the ambient light conditions. The entire automatic control circuit of the present invention may be bypassed by closing the defeat switch 67.

Figure 4:
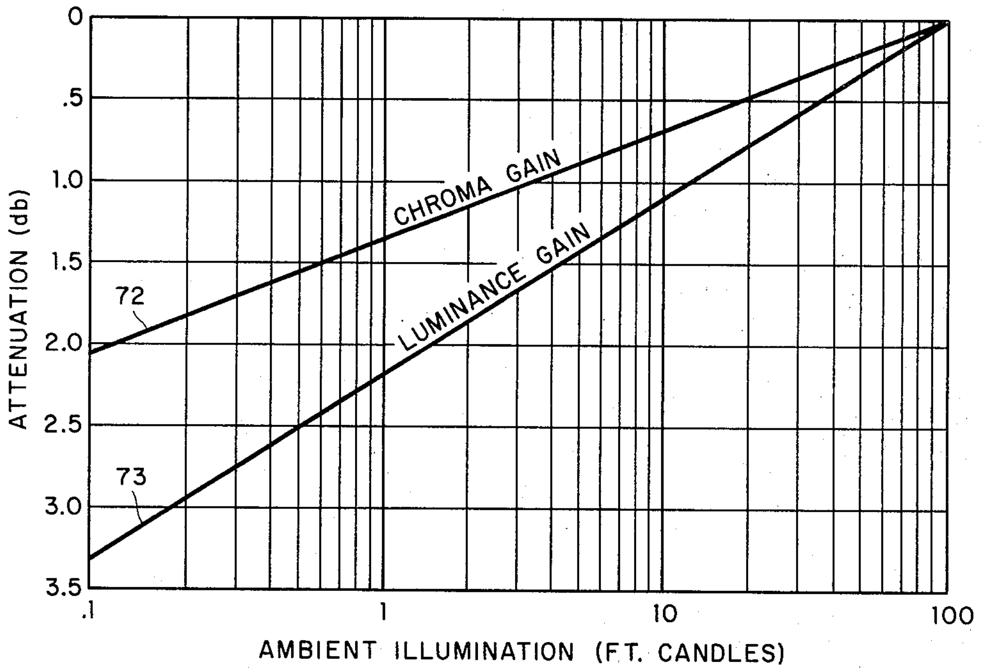
FIG. 4 is a graph showing changes in luminance and chroma signal strength according to changes in ambient light.

Looking now at FIGS. 2 and 4, the relative attenuation of the chroma channel and luminance channel will become apparent. Looking first at FIG. 4, the abscissa is the measure of ambient illumination in foot candles on a log scale, and the ordinate is the measure of attenuation of signal amplitude in dB. At 100 footcandles there is 0 dB attenuation of luminance and chroma signals and as the ambient illumination decreases to 0.1 foot candles, it is seen that the chroma signal line 72 is down 2.1 dB while the luminance signal line 72 is down 3.3 dB. This ratio has been found to be a highly satisfactory ratio giving a very pleasing picture at all ambient light levels between 0.1 footcandles and 100 footcandles of ambient light.

The manner in which this variation in luminance attenuation is achieved may be seen by looking at FIG. 2. As mentioned, the chroma channel signal is varied by the conduction level of transistor 43. As light dependent resistor 41 changes in resistance, the conduction level of transistor 43 will also change with the degree of change being determined by divider resistances 75 and 76. Further the luminance channel gain is determined by resistor 77 since it is this resistor which will control the signal level of light emitting diode 55 which in turn will control the gain to luminance transistor 61. It is these resistors which determine the relative amount of attenuation of gain in the chroma and luminance channels as the ambient light is changed. In this embodiment, resistance 75 is 5.6 k ohms, resistance 76 is 4.3 k ohms, resistance 77 is 3.9 k ohms, resistance 78 is 7.5 k ohms, the voltage applied to the upper terminal of resistance 78 is 35 volts, resistance 63 is 500 ohms, resistance 65 is 25 k ohms, resistance 69 is 4.7 k ohms, capacitance 71 is 47 microfarads, resistance 59 is 1 k ohm, resistance **59*a* is 6.8 k ohms, resistance 62*a* is 1 k ohms, resistance 64*a* is 100 ohms, resistance 64*b* is 6.8 k ohms. Light dependent resistor 41 is a Clariex CL-11360, photocoupler unit 57 is Magnavox Part Number 701482. Transistors 43, 61, 62, and 64** are 2N3962, 2N4916, MPSA20 and 25C685A, respectively. This invention has been incorporated in a Magnavox Company T979 color television chassis.

The effective load resistance for the transistor 61 under direct current conditions is the parallel combination of the resistor 59 and the series pair of resistors 53 and 69 whereas due to the presence of capacitor 71 this effective load resistance under alternating current conditions is the parallel combination of resistors 59 and 53. Thus the ratio of AC to DC gain for this video amplifier stage may be selected by proper selection of these parameters so as to maintain the black level of the picture essentially constant.

Thus while the present invention has been described with respect to a specific embodiment, numerous modifications will suggest themselves to those of ordinary skill in the art. Since the luminance and chroma gains are individually controlled for a given change in ambient light, the gain ratios between the luminance and chroma channels may be selected as desired to achieve a desired effect for a given change in ambient light. Also, while the present invention has been described in the environment of a television receiver, the invention could equally well be used in television monitors as well as many other types of display devices. Accordingly the scope of the present invention is to be measured only by that of the appended claims.

I claim:

1. In a color television apparatus, a circuit for varying color display characteristics in accordance with variations in ambient light comprising:

light sensing means having an electrical parameter which varies in accordance with variations in ambient light intensity incident thereon: and means responsive to variations in said electrical parameter to individually control the gains imparted to both the luminance and chroma signals of the color display to change the color display in accordance with the ambient light intensity.

2. In a color picture display system having a display device comprising:

means for amplifying the chroma signals, means for amplifying the luminance signals, light sensing means having an electrical parameter which varies in accordance with variations in light incident thereon, and modifying means responsive to variations in said electrical parameter for varying the gain of the chroma amplifying means in one manner and for varying the gain of the luminance amplifying means in a diverse manner from said one manner as ambient light is varied.

3. The display system of claim 2 with kinescope means having a first set of electrodes and a second set of electrodes, said chroma amplifying means being coupled to said first set of electrodes and said luminance amplifying means being coupled to said second set of electrodes.

4. The display system of claim 2 with said light sensing means being responsive to the intensity of the ambient light and said parameter varying in accordance with the intensity of ambient light.

5. The display system of claim 4 with said modifying means increasing the gain of said luminance amplifying means at a greater rate than the gain of said chroma amplifying means as said ambient light intensity is increased.

6. A color television apparatus comprising:

a light sensing means having an electrical parameter which varies in accordance with variations in the ambient light intensity incident thereon, means responsive to variations in said electrical parameter to decrease chroma saturation with an increase in ambient light intensity and to increase chroma saturation with a decrease in ambient light intensity.

7. In a color television receiver:

means to selectively receive a color television signal, means to amplify and detect said selected color television signal, luminance gain means to impart a gain to the luminance portion of said color television signal, chroma gain means to impart a gain to the chroma portion of said color television signal, modifying means responsive to ambient light and having a parameter that is varied as the ambient light is varied, said modifying means being coupled to said luminance gain means for modifying the gain of said luminance gain means in accordance with said parameter, said modifying means being coupled to the chroma gain means for modifying the gain of said chroma gain means in accordance with said parameter, kinescope means having color display means, combining means to combine the modified signal from said luminance gain means and the modified signal from said chroma gain means, to energize said color display means thereby forming a color image.

8. The receiver of claim 7 with said modifying means comprising a light dependent resistor means, impedance means coupling said light dependent resistor means to said transistor means to vary the conduction level of said transistor means as the impedance of said light dependent resistor means is varied, said transistor means being coupled to said chroma gain means to control the gain of said chroma gain means.

9. The receiver of claim 8 with second impedance means coupling said light dependent resistor means to said luminance gain means to control the gain of said luminance gain means.

10. The receiver of claim 9 with said second impedance means comprising a parallel combination of capacitance and resistance.

11. The receiver of claim 7 with said modifying means varying the gain of the luminance gain means at a greater rate than the gain of the chroma gain means as ambient light is varied.

12. The receiver of claim 7 with said modifying means being responsive to the intensity of ambient light and said parameter being varied as the intensity of the ambient light is varied.

13. The receiver of claim 7 with said modifying means attenuating the gain of said luminance amplifying means approximately fifty percent more than the gain of said chroma amplifying means, when the attenuation is measured in decibels, as said ambient light intensity is decreased.

14. In a color television receiver:

means to selectively receive a color television signal, means to amplify and detect said selected color television signal, luminance gain means to impart a gain to the luminance portion of said color television signal, chroma gain means to impart a gain to the chroma portion of said color television signal, modifying means responsive to ambient light and having a parameter that is varied as the ambient light is varied, said modifying means being coupled to said luminance gain means for modifying the gain of said luminance gain means in accordance with said parameter, said modifying means being coupled to the chroma gain means for modifying the gain of said chroma gain means in accordance with said parameter, kinescope means having color display means, said color display means comprising multiple color display substances, said kinescope means having a first set of electrodes with an electrode for each of said color substances, said kinescope means having a second set of electrodes with an electrode for each of said color substances, means for coupling said modified luminance signal to said first set of electrodes, means for coupling said modified chroma signal to said second set of electrodes, whereby said modified luminance and modified chroma signals are combined.

* * * * *